Jan. 25, 1966  F. CASTRO  3,230,967
APPARATUS FOR STORING AND CONVEYING
FRESH WATER WITHIN THE SEA
Filed Nov. 4, 1963  2 Sheets-Sheet 1

INVENTOR.
FERNANDO CASTRO
BY
Carl Miller
ATTORNEY

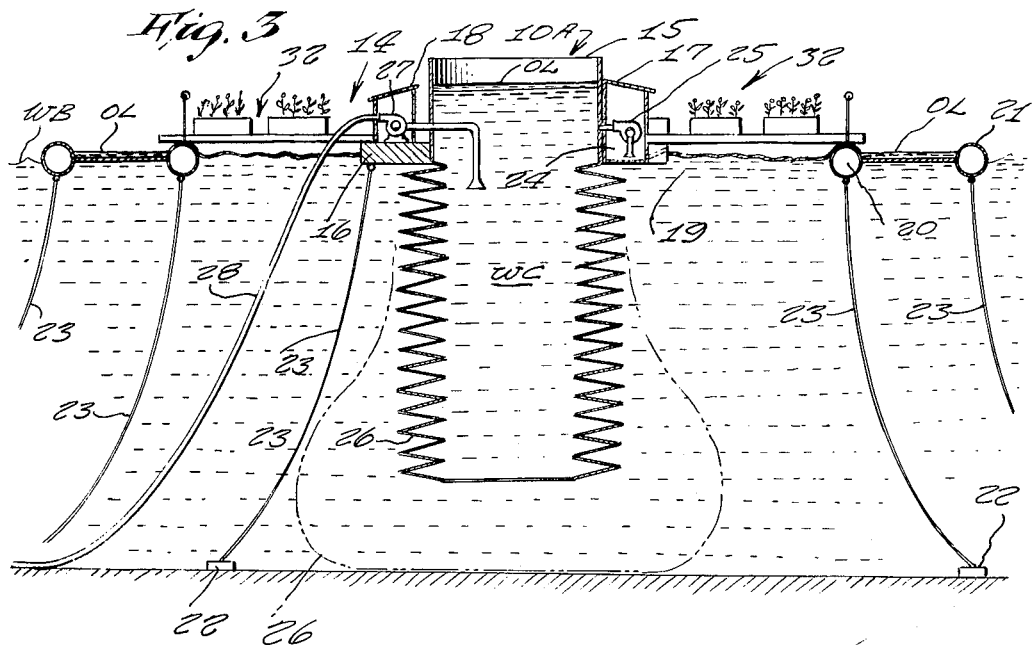
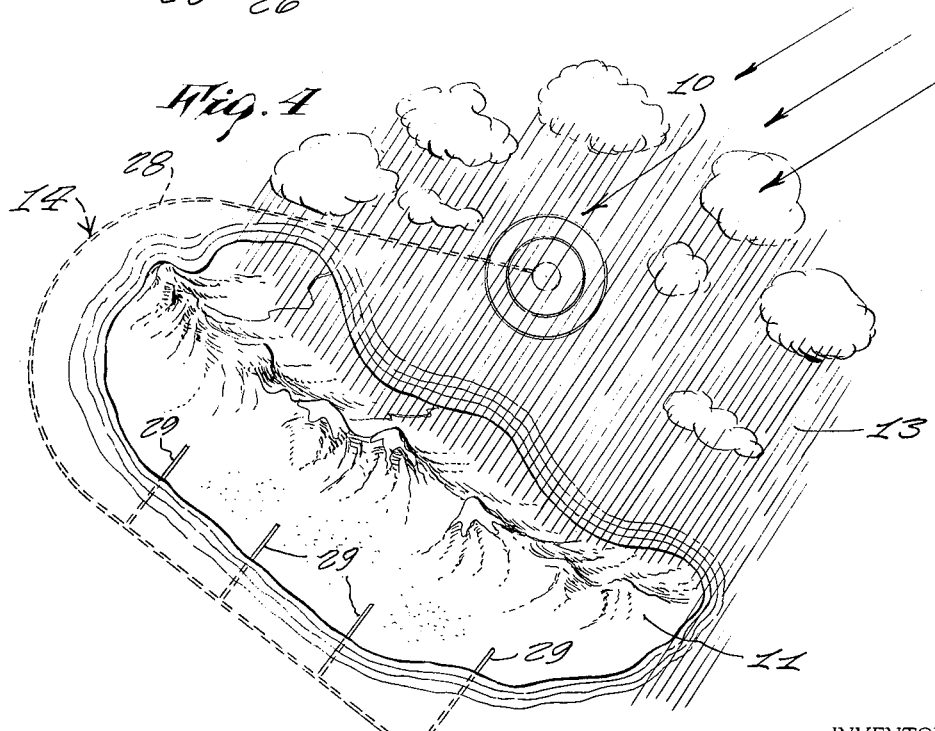

United States Patent Office 3,230,967
Patented Jan. 25, 1966

3,230,967
APPARATUS FOR STORING AND CONVEYING FRESH WATER WITHIN THE SEA
Fernando Castro, Bremerton, Wash.
(1485 Elida St., Caparra Heights, Puerto Rico 00920)
Filed Nov. 4, 1963, Ser. No. 321,115
1 Claim. (Cl. 137—236)

This invention relates to water storage means and more particularly to means for collecting, storing and conveying fresh water within the sea. It is another embodiment and an improvement of the invention covered by patent application Serial No. 68,848, filed on November 14, 1960, by this applicant, now abandoned.

Although many arrangements have been devised to store a liquid submerged in a body of water, little attention has been directed to catching rain falling over the sea and to storing, using and conveying large quantities of fresh water within the sea itself.

Accordingly, an object of this invention is to provide means for catching rainfall falling over the sea and for storing, using and conveying large quantities of such rainwater as well as other fresh water within the sea.

A further object of the present invention is to provide an economical method of collecting and conserving vast quantities of such rainwaters as a cheap source of high quality water, free from the contamination of sediments, organic matter and dissolved salts. This high purity water would become available for such important uses as public water supplies for human consumption, steam power plant boilers and all other industrial processes where high purity is essential.

A further object of the present invention is to provide apparatus located at known rainy regions of the sea to collect and store large quantities of rain waters together with means for their conveyance under the surface of the sea, to remote arid regions for consumption, irrigation and industrial uses.

Still an additional object of the present invention is to provide apparatus for collecting and storing rain and other fresh waters within the sea and means for growing agricultural produce on floating rafts, either by hydroponic culture or in soil filled trays.

Still a further object of the present invention is to provide a system of fresh water reservoirs within the sea for use as ponds for the seeding and cultivation of fresh water fish and other valuable species of fresh water plant and animal life.

Still an additional object of the present invention is to reclaim valuable land now occupied by land based fresh water reservoirs by providing means to transfer such land based reservoirs to sea based locations.

The foregoing and other objects and advantages will become more clearly understood by referring to the following description and the accompanying drawings wherein:

FIGURE 3 is a diagrammatical sectional view similar to FIGURE 2 of a modified catch and storage means made in accordance with the present invention.

FIGURE 4 is a plan view illustrating a typical geographical location and installation of the novel rainfall catch and storage means of FIGURES 1 and 2.

Figures 1, 2:
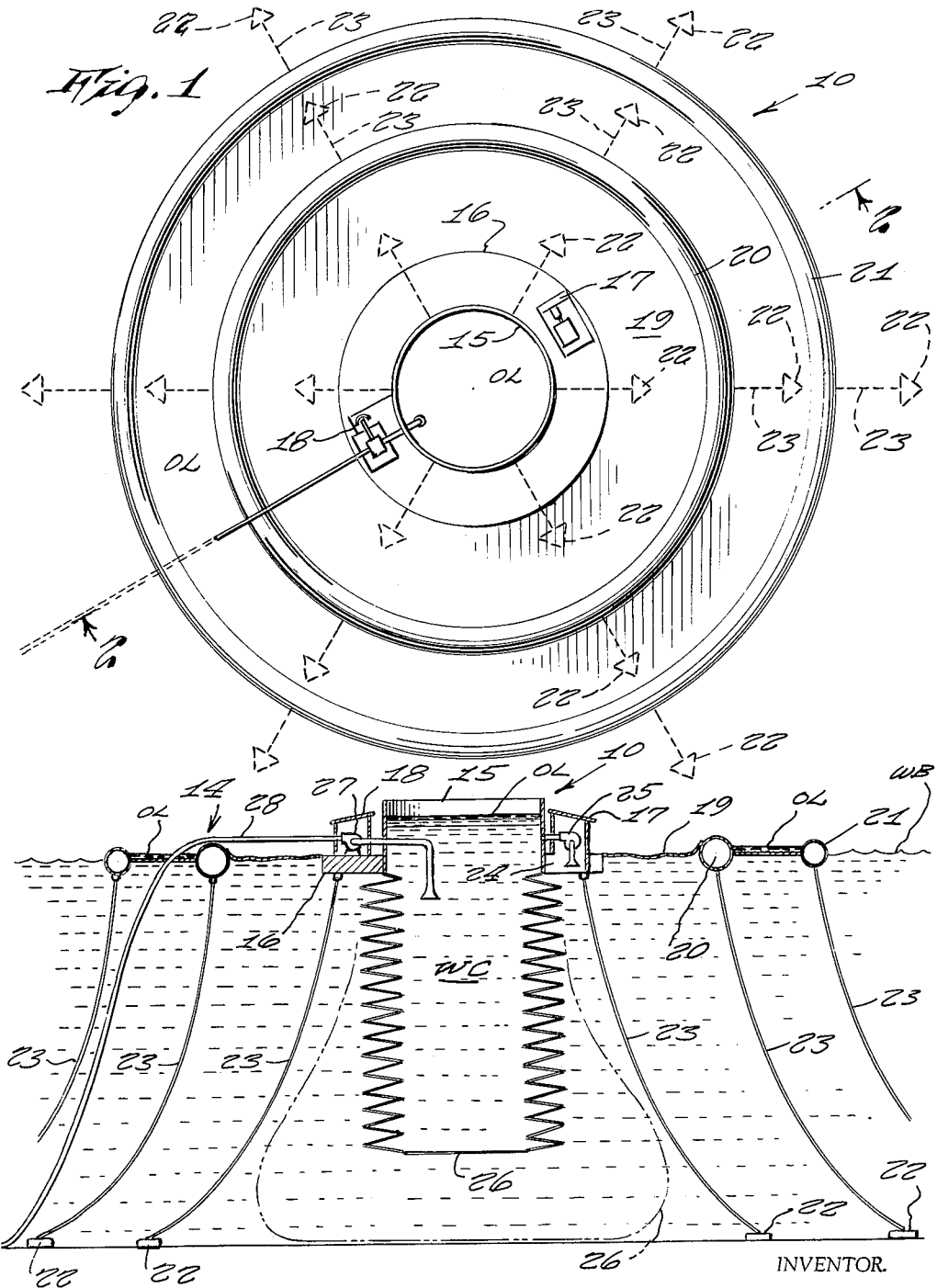
FIGURE 1 is a plan view of a rainfall catch and storage means made in accordance with the present invention.
FIGURE 2 is a diagrammatical sectional view of the novel device of FIGURE 1 in operation.

Referring now to the drawings and particularly to FIGURE 4, a novel rainfall catch and fresh water storage device 10 made in accordance with the present invention is located at sea, on the windward side of a mountain range 11. Prevailing winds 12 move clouds toward the mountain range 11 and resulting rainfall 13 occurs, part of which is caught and stored by the novel device 10. A stored water delivery and distributing system 14 is provided and includes a leader 28 for carrying stored water to the coast on the arid leeward side of mountain 11 and a plurality of feeder lines 29 for releasing the delivered water.

Obviously, this novel method offers a fresh water supply system of high purity at low cost, since it requires no expensive engineering works such as the usual dams, tunnels, filtering and treatment plants, etc. on land based water storage schemes.

As is shown in FIGURES 1 and 2, the catch and storage device 10 has a rigid tank or standpipe 15, open at its top and bottom, supported by an annular or ring type float 16 on the surface of the sea WB. Float 16 supports a pair of pump houses 17 and 18, and has an annular apron 19 forming a catch basin for rain water. An annular float 20 is connected to the outer edge of apron 19 to provide support thereto while a second annular float 21 encircles and is spaced from float 20. Float 16 is rigid while floats 20 and 21 may be of rigid or flexible construction. Apron 19 is preferably of a flexible impermeable material such as polyethylene. Each of floats 16, 20, and 21 is held at its desired flotation site by a plurality of anchors 22 each connected to a float by guy lines 23.

At the bottom of pump house 17 there is a sump 24 to receive collected rain water WC from the apron or catch basin 19. A pump 25 is provided in house 17 for removing the collected water WC from sump 24 and transferring it to tank or standpipe 15. A flexible and expansible member 26 is connected at its open top to the open bottom of rigid tank or standpipe 15 together forming a reservoir to store collected water WC. The expansible vessel 25 is made preferably of a polyethylene material or the like with an annular bellows type wall to permit expansion. An oil layer OL is provided in tank 15 to prevent evaporation of the collected water WC while a similar layer is provided on the surface of the sea WB between floats 20 and 21 to minimize wind friction and prevent splash on to apron 19.

Tank or standpipe 15 extends above sea level a sufficient distance to accommodate the resulting rise of the fresh water column above the surrounding sea as the rainwaters fall on apron or catchbasin 19, run into sump 24 and are pumped into tank 15 by pump 25. As the fresh water accumulates in expansible vessel 26, it will cause it to expand downwards until it reaches bottom and thereafter it will continue to expand laterally to its ultimate holding capacity as indicated in FIGURES 2 and 3. At the same time the free surface of fresh water in tank or standpipe 15 will rise above sea level roughly about 1 foot for every 31 feet that the bottom of vessel 26 sinks below sea level.

The water delivery and distribution system 14 in addition to having the leader 28 and feeders 29 includes a pump 27 in pump house 18 for removing the collected water WC from the floating reservoir.

The rainfall collecting and fresh water storing device 10 may be modified as shown in FIGURE 3. The modified device 10A is the same in all respects to the device 10 of FIGURES 1 and 2. However, the catch basin is modified by adding a system of trays 32 supported on floating rafts. Such trays to be used for utilizing the available solar energy and abundant fresh water for the cultivation of agricultural crops either by hydroponic culture or in soil filled trays.

System 14 could also be modified to convey fresh surface waters from land based catchment facilities to the submerged storage vessels of device 10 or 10A.

While certain novel features of my invention have shown and described and are pointed out, in the annexed claim, it will be understood that various omissions, substitutions and changes in the forms and details of the device illustrated and in its operation can be made by those skilled in the art without departing from the spirit of the invention.

Having thus described my invention, I claim as new and desire to secure by Letters Patent:

A device for collecting, using, storing and conveying rain and other fresh water within the sea, comprising a rigid tank open at its top and bottom, supported by a rigid sea borne float; a flexible and floatable water tight apron extending outwardly from the tank over a plurality of supporting floats and spread so as to receive rain water as it falls, the apron and float assemblage being provided with a depressed sump to collect the rain water falling on the apron; a pump mounted on a supporting float for removing rain water from the sump and transferring it to the rigid tank; a flexible, expansible water tight vessel open only at its top and connected at its open top to the open bottom of the tank to provide a reservoir within the sea for rain water from the sump or fresh water from land based catchments; a second float supported pump for transferring water from the reservoir to a delivery and distribution system; an outermost float surrounding the rain collecting apron and float assemblage at a convenient distance; an oil or other splash suppressing lubricating layer over the intervening sea between the apron and the outermost float; and a plurality of anchors connected to the device to prevent movement from its desired flotation site.

References Cited by the Examiner

UNITED STATES PATENTS 2,062,755  12/1936  Lyons et al. _____ 47—1.2

ABRAHAM G. STONE, *Primary Examiner.*

ROBERT E. BAGWILL, *Assistant Examiner.*